United States Patent

(12) United States Patent
Frankovics

(10) Patent No.: US 11,654,956 B2
(45) Date of Patent: May 23, 2023

(54) METHOD AND SYSTEM FOR STEERING INTERVENTION BY ELECTRONIC POWER STEERING UNIT TO PREVENT VEHICLE ROLLOVER OR LOSS OF CONTROL

(71) Applicant: Robert Bosch GmbH, Stuttgart (DE)

(72) Inventor: Achim Frankovics, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 598 days.

(21) Appl. No.: 16/725,233

(22) Filed: Dec. 23, 2019

(65) Prior Publication Data
US 2021/0188343 A1 Jun. 24, 2021

(51) Int. Cl.
*B60R 21/013* (2006.01)
*B62D 5/04* (2006.01)
(Continued)

(52) U.S. Cl.
CPC ........ *B62D 5/0421* (2013.01); *B60R 16/0233* (2013.01); *B62D 5/0481* (2013.01);
(Continued)

(58) Field of Classification Search
CPC .... B62D 5/0421; B62D 5/0481; B62D 6/002; B62D 5/0463; B62D 6/006; B62D 6/008;
(Continued)

(56) References Cited

U.S. PATENT DOCUMENTS 6,736,236 B2 * 5/2004 Kurishige ............ B62D 5/0466
180/443
6,968,921 B2 11/2005 Turner
(Continued)

FOREIGN PATENT DOCUMENTS

CN 104828082 A * 8/2015 .......... B60W 10/184
CN 112677992 A * 4/2021
(Continued)

OTHER PUBLICATIONS

"Development of an Electronic Stability Program Completed with Steering Intervention for Heavy Duty Vehicles;" P. Koleszar; B. Trencseni; L. Palkovics; Proceedings of the IEEE International Symposium on Industrial Electronics, 2005. ISIE 2005. (vol. 1, pp. 379-384); Jan. 1, 2005. (Year: 2005).*
(Continued)

*Primary Examiner* — Khoi H Tran
*Assistant Examiner* — Jorge O Peche
(74) *Attorney, Agent, or Firm* — Michael Best & Friedrich LLP

(57) ABSTRACT

A vehicle steering intervention system and method prevents a loss of vehicle control condition or a vehicle rollover condition. The system includes a driver input torque sensor for sensing torque applied by a driver to a steering wheel, a steering angle sensor for sensing a steering angle, and a speed determination device for determining a vehicle speed. An electronic power steering unit includes an electronic processor and a memory. The electronic power steering unit determines a vehicle steering intervention threshold based on the torque sensed, the steering angle, and the vehicle speed. The electronic power steering unit predicts whether the vehicle steering intervention threshold will be exceeded within a predetermined time based on a torque gradient and/or a steering angle gradient. When the vehicle steering intervention threshold is predicted to be exceeded, the electronic power steering unit reduces a power steering assist and/or provides a counter steer force.

17 Claims, 3 Drawing Sheets

(51) Int. Cl.
  *B60R 16/023*   (2006.01)
  *B62D 6/00*    (2006.01)
  *B60R 16/027*   (2006.01)
(52) U.S. Cl.
  CPC ............ *B62D 6/002* (2013.01); *B60R 16/027* (2013.01); *B60R 21/013* (2013.01); *B62D 5/0463* (2013.01)
(58) Field of Classification Search
  CPC ........ B62D 6/003; B62D 15/025; B62D 6/00; B60R 16/0233; B60R 16/027; B60R 21/013
  See application file for complete search history.

(56) References Cited

U.S. PATENT DOCUMENTS

| | | | | |
|---|---|---|---|---|
| 7,894,955 | B2* | 2/2011 | Milot | B60G 17/0195 |
| | | | | 280/5.502 |
| 8,620,528 | B2* | 12/2013 | Lemmen | B62D 6/002 |
| | | | | 701/41 |
| 8,965,633 | B2* | 2/2015 | Lee | B62D 6/02 |
| | | | | 701/44 |
| 9,266,552 | B2* | 2/2016 | Guerster | B62D 5/0457 |
| 9,738,307 | B2* | 8/2017 | Endo | B62D 5/0463 |
| 10,259,494 | B2 | 4/2019 | Schramm | |
| 10,759,416 | B1* | 9/2020 | Funke | B60T 8/17554 |
| 10,821,981 | B1* | 11/2020 | Funke | B62D 7/159 |
| 11,136,021 | B1* | 10/2021 | Funke | B62D 7/159 |
| 2004/0010383 | A1* | 1/2004 | Lu | B60G 17/0162 |
| | | | | 702/41 |
| 2004/0019418 | A1* | 1/2004 | Lu | B62D 6/002 |
| | | | | 701/38 |
| 2004/0030473 | A1* | 2/2004 | Lu | B60R 16/0233 |
| | | | | 701/36 |
| 2004/0064246 | A1* | 4/2004 | Lu | B60R 21/0132 |
| | | | | 701/45 |
| 2005/0222727 | A1* | 10/2005 | Hille | B60W 30/04 |
| | | | | 280/5.502 |
| 2005/0236894 | A1* | 10/2005 | Lu | B62D 11/08 |
| | | | | 303/139 |
| 2005/0240328 | A1* | 10/2005 | Shirato | B62D 1/286 |
| | | | | 701/1 |
| 2009/0254253 | A1* | 10/2009 | Ghoneim | B62D 6/02 |
| | | | | 701/42 |
| 2009/0271074 | A1* | 10/2009 | Hulten | B62D 6/008 |
| | | | | 701/42 |
| 2010/0191423 | A1* | 7/2010 | Koyama | B60W 30/09 |
| | | | | 701/42 |
| 2011/0022268 | A1* | 1/2011 | Kojo | B62D 5/003 |
| | | | | 701/41 |
| 2015/0353125 | A1* | 12/2015 | Tsubaki | B62D 1/286 |
| | | | | 701/42 |
| 2016/0075373 | A1* | 3/2016 | Fukukawa | B62D 15/021 |
| | | | | 701/42 |
| 2017/0175659 | A1* | 6/2017 | Sunahara | F02D 17/02 |
| 2017/0253143 | A1* | 9/2017 | Tang | B60L 15/2036 |
| 2018/0079447 | A1* | 3/2018 | Yamashita | B62D 5/0469 |
| 2019/0009815 | A1* | 1/2019 | Lavoie | B62D 13/06 |
| 2019/0263458 | A1* | 8/2019 | Fahland | B62D 35/008 |
| 2020/0010112 | A1* | 1/2020 | Toko | B62D 5/0409 |
| 2020/0172166 | A1* | 6/2020 | Chang | B62D 6/002 |
| 2020/0391788 | A1* | 12/2020 | Kim | B62D 6/00 |
| 2021/0163063 | A1* | 6/2021 | Shibata | B62D 5/0481 |
| 2021/0179093 | A1* | 6/2021 | Miyamoto | B60W 30/0956 |
| 2021/0188343 | A1* | 6/2021 | Frankovics | B62D 6/008 |
| 2021/0245800 | A1* | 8/2021 | Kitazume | B62D 5/0463 |
| 2021/0370943 | A1* | 12/2021 | Jung | B60T 17/221 |

FOREIGN PATENT DOCUMENTS

| | | | | |
|---|---|---|---|---|
| CN | 113859218 | A * | 12/2021 | |
| DE | 102004022098 | A1 | 11/2005 | |
| DE | 102014211131 | A1 * | 12/2014 | ........... B62D 15/024 |
| DE | 102014015721 | B4 * | 1/2016 | .............. B60L 11/18 |
| DE | 102017206700 | A1 * | 10/2017 | .......... B60W 40/105 |
| DE | 102017205564 | A1 | 10/2018 | |
| DE | 102005012584 | B4 * | 1/2019 | ............. B62D 5/008 |
| DE | 102018201192 | A1 * | 7/2019 | |
| DE | 112018005542 | T5 * | 6/2020 | ............. B60G 15/02 |
| DE | 102019213402 | A1 * | 3/2021 | |
| DE | 112012007083 | B4 * | 5/2021 | ......... B60G 17/0162 |
| DE | 102020215632 | A1 * | 6/2021 | ......... B60R 16/0233 |
| DE | 102010054696 | B4 * | 4/2022 | ............. B62B 3/001 |
| DE | 112020005297 | T5 * | 10/2022 | ........ B60G 17/0162 |
| EP | 0510365 | A2 * | 10/1992 | |
| EP | 0640903 | A1 * | 3/1995 | |
| EP | 1386805 | A2 * | 2/2004 | ......... B60G 17/0162 |
| EP | 1386806 | A1 * | 2/2004 | ......... B60G 17/0162 |
| EP | 1588922 | A2 * | 10/2005 | ............. B62D 1/286 |
| EP | 2106988 | A1 * | 10/2009 | ............. B62D 5/008 |
| EP | 1807300 | B1 * | 3/2012 | ........... B62D 15/025 |
| EP | 2952414 | A1 * | 12/2015 | ............. B62D 1/286 |
| EP | 3130526 | A1 * | 2/2017 | ............. B62D 5/008 |
| EP | 3312038 | A1 * | 4/2018 | ............. B60K 28/16 |
| EP | 3674172 | A1 * | 7/2020 | ............... B62D 1/12 |
| EP | 3808623 | A1 * | 4/2021 | ................ B60T 7/18 |
| EP | 3406121 | B1 * | 6/2021 | ........... A01B 69/008 |
| FR | 2861043 | A1 * | 4/2005 | ............. B60T 8/1755 |
| FR | 3031076 | A1 * | 7/2016 | ............... B62D 1/02 |
| GB | 2412100 | A * | 9/2005 | ............. B60T 8/1755 |
| GB | 2574393 | A * | 12/2019 | ......... B60W 30/045 |
| HU | T78137 | A * | 8/2000 | |
| JP | H0780407 | B2 * | 8/1995 | |
| JP | 2002145035 | A | 5/2002 | |
| JP | 2002256947 | A * | 9/2002 | |
| JP | 2005122274 | A * | 5/2005 | |
| JP | 3760533 | B2 * | 3/2006 | ............... B62D 5/06 |
| JP | 2007069757 | A * | 3/2007 | |
| JP | 2007203885 | A * | 8/2007 | |
| JP | 4935022 | B2 * | 5/2012 | |
| JP | 5769132 | B2 * | 8/2015 | |
| JP | WO2014038134 | A1 * | 8/2016 | |
| JP | 6528910 | B2 * | 6/2019 | ............. B62D 1/286 |
| JP | 2021049824 | A * | 4/2021 | |
| JP | 2021075267 | A * | 5/2021 | ............. B60W 10/10 |
| JP | 7155964 | B2 * | 10/2022 | ............. B60T 8/1763 |
| WO | WO-2005042321 | A1 * | 5/2005 | ......... B60T 8/17555 |
| WO | WO-2006112094 | A1 * | 10/2006 | ......... B60R 16/0233 |
| WO | WO-2007129750 | A1 * | 11/2007 | ........... B62D 5/0472 |
| WO | WO-2009125271 | A1 * | 10/2009 | ............. B62D 5/003 |
| WO | WO-2014136189 | A1 * | 9/2014 | ............. B60T 8/1755 |
| WO | WO-2015032994 | A1 * | 3/2015 | ............. B60T 8/1755 |
| WO | WO-2019058230 | A1 * | 3/2019 | ............. B60K 17/02 |
| WO | WO-2020117046 | A1 * | 6/2020 | ............... B60K 1/04 |

OTHER PUBLICATIONS

"Electric motor based steering for jackknife avoidance in large trucks;" R. McCann, A. Le; 2005 IEEE Vehicle Power and Propulsion Conference (p. 7 pp.); Jan. 1, 2005. (Year: 2005).*

"Vehicle Rollover Avoidance;" Shih-Ken Chen, Nikolai Moshchuk, Flavio Nardi, Jihan Ryu; IEEE Control Systems (vol. 30, Issue: 4, pp. 70-85); Jul. 30, 2010. (Year: 2010).*

German Patent Office Action for Application No. 102020215632.8 dated Mar. 1, 2023 (6 pages including statement of relevance).

* cited by examiner

METHOD AND SYSTEM FOR STEERING INTERVENTION BY ELECTRONIC POWER STEERING UNIT TO PREVENT VEHICLE ROLLOVER OR LOSS OF CONTROL

BACKGROUND

This arrangement relates to a system and method for providing steering intervention during vehicle operation by minimizing turning or movement of a vehicle that could result in vehicle rollover or loss of control.

SUMMARY

The electronic power steering unit of a vehicle is configured to determine a rollover condition or loss of control and prevent vehicle rollover or loss of control, such as spinning out, by reducing the power steering assist and/or by providing a counter steer force when a steering wheel is being manipulated too forcefully. In one example, a vehicle is operated at a speed of greater than 50 miles per hour. A quick and large turning or force applied to a steering wheel may result in vehicle rollover or loss of vehicle control. The electronic power steering unit is configured to determine such a condition and prevent vehicle rollover or loss of control with immediate action. Other vehicles may use a driver assistance system domain controller or other element to perform rollover calculations. Such an arrangement requires more time to calculate, to react, and to provide rollover prevention control for the vehicle.

One embodiment is a vehicle steering intervention system for preventing a loss of control condition or a vehicle rollover condition for a vehicle. The vehicle steering intervention system includes a driver input torque sensor for sensing a torque applied by a driver to a steering device, a steering angle sensor for sensing a steering angle, a speed determination device for determining a vehicle speed, and an electronic power steering unit including an electronic processor and a memory. The electronic processor is configured to: determine a vehicle steering intervention threshold based on the torque sensed by the driver input torque sensor, the steering angle, and the vehicle speed, and execute a prediction model. The prediction model includes determining a torque gradient of the torque sensed by the driver input torque sensor, predicting whether the vehicle steering intervention threshold will be exceeded within a predetermined time based on the torque gradient, and when the vehicle steering intervention threshold is predicted to be exceeded within the predetermined time, the electronic processor reduces a power steering assist and/or provides a counter steer force to the steering device to avoid the loss of control condition or the vehicle rollover condition.

Another embodiment is a method for providing steering intervention for a vehicle. The method includes: sensing a torque applied by a driver to a steering device with a driver input torque sensor, sensing a steering angle, determining a vehicle speed, determining a vehicle steering intervention threshold with an electronic power steering unit based on the torque sensed by the driver input torque sensor, the steering angle, and the vehicle speed. The method includes determining a torque gradient of the torque sensed by the driver input torque sensor; and predicting, with a prediction model stored in the electronic power steering unit, whether the vehicle steering intervention threshold will be exceeded within a predetermined time based on the torque gradient; and when the vehicle steering intervention threshold is predicted to be exceeded within the predetermined time, the electronic power steering unit is configured to reduce a power steering assist and/or provide a counter steer force to the steering device to avoid a loss of control condition or a vehicle rollover condition.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable media) executable by one or more electronic controllers. For example, "units," "control units," and "controllers" described in the specification can include one or more electronic controllers, one or more memories including non-transitory computer-readable media, one or more input/output interfaces, one or more application specific integrated circuits (ASICs) and other circuits, and various connections or connectors (for example, wires, printed traces, and buses) connecting the various components.

Figure 1:
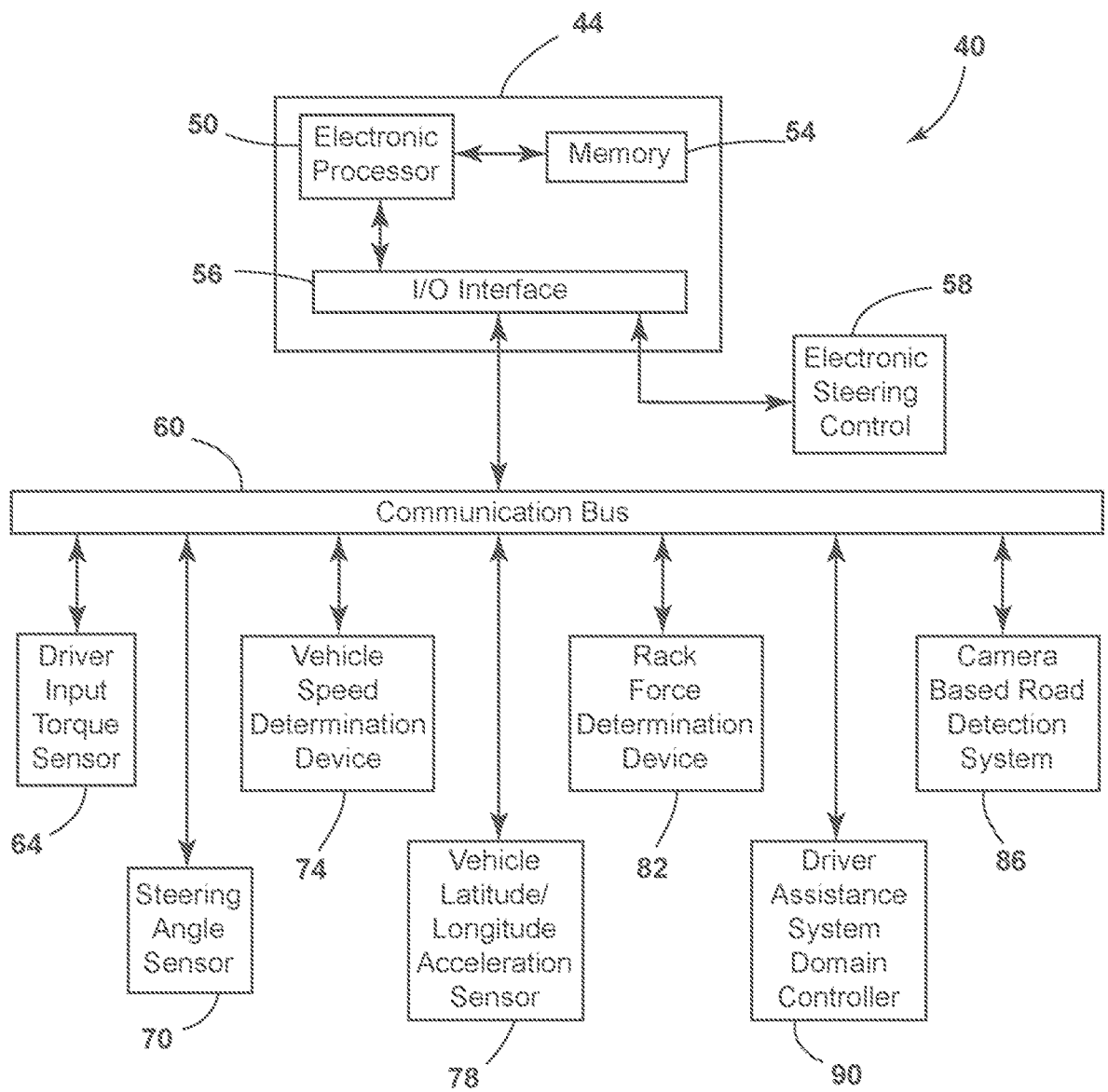
FIG. 1 illustrates a block diagram of one embodiment of a vehicle steering intervention system to eliminate loss of control or rollover of a vehicle.

FIG. 1 shows a block diagram view of a vehicle steering intervention system 40 for controlling vehicle steering. In one embodiment, the vehicle steering intervention system 40 includes an electronic power steering unit 44. The electronic power steering unit 44 includes an electronic processor 50 and a memory 54. The memory 54 includes one or more memory modules, such as a random access memory ("RAM") and an electronically erasable programmable read-only memory ("EEPROM"). An input/output interface 56 transmits and receives information over a communication bus 60. The electronic processor 50 processes the information by executing one or more applications or modules. The applications or modules can be stored as instructions or commands in the memory 54. The electronic processor 50 also stores information in the memory 54 generated by applications. An electronic steering control 58, such as a power steering control motor, is connected to and controlled by the electronic power steering unit 44.

The communication bus 60 shown in FIG. 1 is a FlexRay automotive communication bus, controller area network (CAN) bus or other type of communication link between a plurality of control units, sensors, and other devices. In some embodiments, the communication bus 60 connects the electronic power steering unit 44 to a driver input torque sensor 64 that senses or provides a force applied by a driver to a steering wheel. A steering angle sensor 70 is connected to the communication bus 60 to provide a steering wheel position to the electronic power steering unit 44. In one embodiment, the steering angle sensor 70 is disposed on a steering column of the steering device. In another embodiment, the steering angle sensor 70 is configured to sense rotation of a pinion gear secured to a steering shaft of the vehicle. In another embodiment, the steering angle sensor 70 determines steering angle based on motor rotation of the power steering control motor and a ratio with respect to the rack and pinion gear.

In one embodiment, a vehicle speed determination device 74 determines a vehicle speed. In another embodiment, the vehicle speed determination device 74 is a vehicle speed sensor. In another embodiment, calculations of other information provide vehicle speed. In one embodiment, a vehicle latitude/longitude acceleration sensor 78 senses acceleration of the vehicle. The vehicle speed and acceleration are provided via the communication bus 60 to the input/output interface 56 of the electronic power steering unit 44.

FIG. 1 shows a rack force determination device 82 for sensing a rack force for the wheels. In another embodiment, the rack force is calculated from other information provided in the vehicle. A camera based road detection system 86 senses video and various other sensed images to determine the presence of a low friction surface, such as snow, ice, gravel, and puddles of water on a road. The camera based road detection system 86 includes a processor and memory to process images and determine the condition of a road. In some embodiments, an external temperature sensor assists in determining the presence of ice or snow. The rack force determination device 82 and the camera based road detection system 86 are connected to the electronic power steering unit 44 via the communication bus 60.

Further, FIG. 1 shows a driver assistance system domain controller 90. The driver assistance system domain controller 90 (DASy) implements traffic jam assist and highway assist features for the vehicle. In some embodiments the driver assistance system domain controller 90 provides electronic stability control for the vehicle. By providing processing of the vehicle steering intervention at the electronic power steering unit 44, a response time to changes in vehicle steering is enhanced.

Operation

Figure 2:
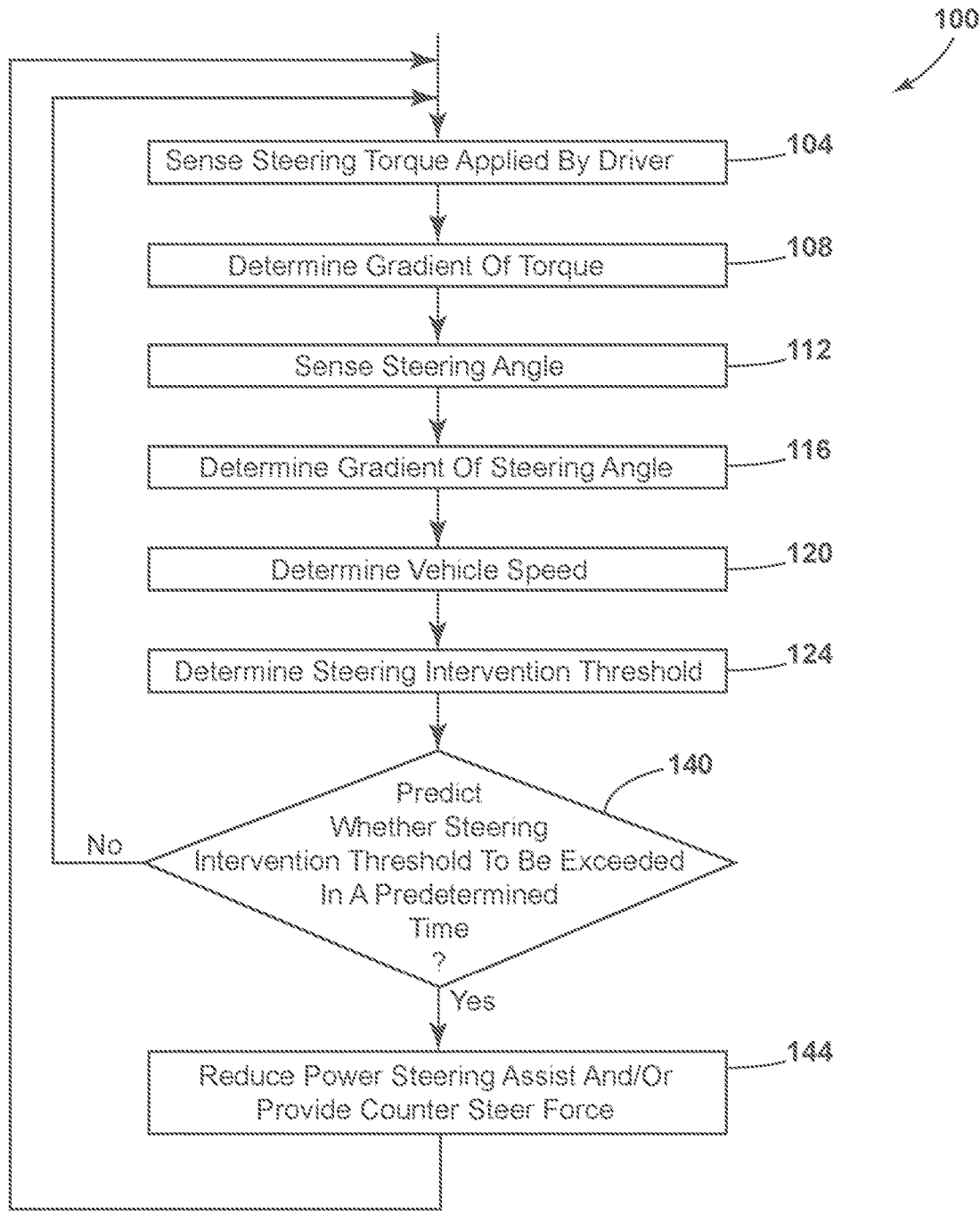
FIG. 2 illustrates a flow chart for an embodiment of an electronic power steering unit providing vehicle steering intervention.

FIG. 2 shows a flow chart 100 of the operation of the electronic power steering unit 44 shown in FIG. 1. While a single electronic power steering unit 44 is shown in FIG. 1, multiple control units and/or electronic processors can perform the various functions shown in FIG. 2. The multiple steps shown in FIG. 2 can occur essentially simultaneously or in parallel with multiple electronic processors of the electronic power steering unit 44.

FIG. 2 is directed to a flow chart 100 showing initial operation of the vehicle steering intervention system 40. At step 104, in one embodiment, torque applied by a driver to a vehicle steering wheel that is sensed by the driver input torque sensor 64 is received by the electronic processor 50 over the communication bus 60. Thereafter, at step 108, the electronic processor 50 determines or calculates a gradient of the torque (change of torque).

At step 112 shown in FIG. 2, the electronic processor 50 is configured to receive the steering angle, which is sensed by a steering angle sensor 70 over the communication bus 60. The electronic processor 50 advances to step 116 and determines or calculates a gradient of the steering angle in one embodiment.

Thereafter, the electronic processor advances to step 120, wherein vehicle speed is received from the vehicle speed determination device 74 over the communication bus 60. Then, the electronic processor 50 advances to step 124.

At step 124, the electronic processor 50 is configured to execute an algorithm to determine a vehicle steering intervention threshold. In one embodiment, the vehicle steering intervention threshold is based on at least the torque sensed by the driver input torque sensor 64, the steering angle, and the vehicle speed. In one embodiment, the determining of the vehicle steering intervention threshold is performed by a look up table that includes values for torque, steering angle and vehicle speed. In another embodiment, the determining of the vehicle steering intervention threshold is performed by an equation that includes variables corresponding to at least torque, steering angle, and vehicle speed, that is specific to a make and model of the vehicle. In another embodiment, a three dimensional graph is used to determine the steering intervention threshold.

The electronic processor 50 advances to decision step 140 to predict, with a prediction model stored in the memory 54 of the electronic power steering unit 44, whether the vehicle steering intervention threshold will be exceeded within a predetermined time based on the torque gradient and/or based on the steering angle gradient. The gradient(s) or derivative(s) in view of the predetermined time provide a prediction of a future position of the steering arrangement of the vehicle. When steering intervention is unnecessary at decision step 140, the program operated by the electronic processor 50 returns to step 104 and again determines torque from steering, and repeats steps 108, 112, 116, 120, 124.

When the vehicle steering intervention threshold is predicted to be exceeded within the predetermined time, the electronic processor 50 advances to step 144. At step 144, the electronic processor 50 power steering unit reduces a power steering assist by reducing power to the electronic steering control 58 and/or provide a counter steer force to the electronic steering control 58 to avoid the loss of control condition or the vehicle rollover condition. The electronic processor 50 then returns to step 104 to repeat the prediction process.

The electronic processor 50 prevents a sudden change in steering direction from causing loss of vehicle control or a vehicle rollover condition. The electronic processor 50 executes the prediction model by determining that the torque gradient and/or the steering angle gradient has/have value(s) that will exceed the vehicle steering intervention threshold within the predetermined time.

Additional Optional Embodiment(s)

Figure 3:
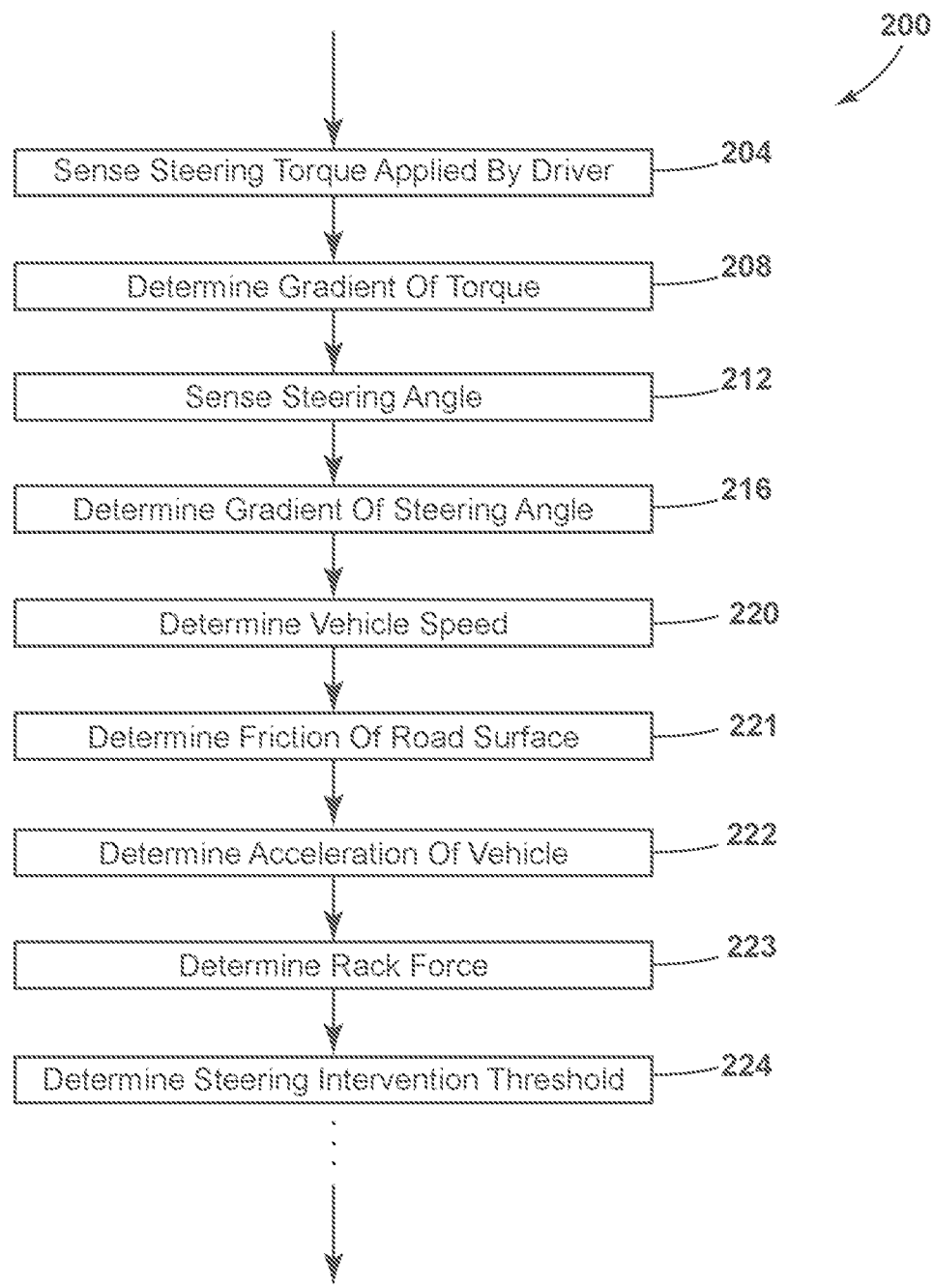
FIG. 3 illustrates a flow chart that shows additional sensing of properties to determine a vehicle steering intervention threshold.

FIG. 3 shows a flow chart 200 of an additional embodiment of the vehicle steering intervention. Steps 204, 208, 212, 216, 220 in FIG. 3 are identical to steps 104, 108, 112, 116, 120 shown in FIG. 2. Thus, further description thereof is not necessary.

As shown at step 221 in FIG. 3, the electronic processor 50 receives a friction value for the road surface from the camera based road detection system 86 over the communication bus 60. The electronic processor 50 advances to step 222 to receive vehicle acceleration from the vehicle latitude/longitude acceleration sensor 78 over the communication bus 60. The electronic processor 50 advances to step 223.

At step 223 shown in FIG. 3, a rack force that is determined by the rack force determination device 82, which is provided to the electronic processor 50 over the communication bus 60. The electronic processor 50 is configured to advance to step 224.

At step 224, the electronic processor 50 executes an algorithm to determine a vehicle steering intervention threshold. In the FIG. 3 embodiment, the vehicle steering intervention threshold is based on the torque sensed by the driver input torque sensor 64, the steering angle, the vehicle speed, the rack force, the vehicle acceleration, and the friction of the road surface. The electronic processor 50 then advances to additional steps (not shown) that correspond to decision step 140, and other step 144 as shown in FIG. 2, to provide steering intervention when necessary as discussed above.

In another embodiment, the vehicle steering intervention threshold is based on the torque sensed by the driver input torque sensor 64, the steering angle, the vehicle speed, the rack force determined by the rack force determination device 82, and by a model of the vehicle that is stored in memory 54. In another embodiment, the vehicle steering intervention threshold is based on the torque sensed by the driver input torque sensor 64, the steering angle, the vehicle speed, and the vehicle acceleration. In yet another embodiment, the vehicle steering intervention threshold is based on the torque sensed by the driver input torque sensor 64, the steering angle, the vehicle speed, and the friction of the road surface. In some embodiments, vehicle steering intervention threshold is dependent on the make/model of the vehicle, and in some instances, further upon the driving mode.

The above steps shown in the embodiments of FIGS. 2 and 3 are provided for purposes of illustration. The steps can occur in an entirely different order. In one embodiment, there is no determination of a gradient of steering angle and thus steps 116, 216 are not included. In some embodiments, friction of the road surface, rack force, and acceleration are not determined. Thus, steps 221, 222, 223 are optional in some embodiments.

While not specifically discussed herein, returning the steering wheel to orient the vehicle for travel in a straight line path or direction, typically does not approach a stability threshold as a possibility of a rollover condition is reduced when the vehicle is moving in a straight direction. The arrangement is mainly directed to preventing sudden and large changes in vehicle direction that may result in a vehicle rollover condition or loss of control condition.

It should be understood that although the system depicts components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

Various features, advantages, and embodiments are set forth in the following claims.

What is claimed is:

1. A vehicle steering intervention system for preventing a loss of control condition or a vehicle rollover condition for a vehicle, the vehicle steering intervention system comprising:
a driver input torque sensor for sensing a torque applied by a driver to a steering device;
a steering angle sensor for sensing a steering angle;
a vehicle speed determination device for determining a vehicle speed; and
an electronic power steering unit including an electronic processor and a memory, wherein the electronic processor is configured to:
determine a vehicle steering intervention threshold based on the torque sensed by the driver input torque sensor, the steering angle, and the vehicle speed, and
execute a prediction model by:
determining a torque gradient of the torque sensed by the driver input torque sensor,
determining a steering angle gradient from the steering angle sensed by the steering angle sensor,
predicting whether the vehicle steering intervention threshold will be exceeded within a predetermined time based on the torque gradient and the steering angle gradient, and
when the vehicle steering intervention threshold is predicted to be exceeded within the predetermined time, reducing a power steering assist and/or providing a counter steer force to the steering device to avoid the loss of control condition or the vehicle rollover condition.

2. The vehicle steering intervention system according to claim 1, wherein the steering angle sensor is disposed on a steering column of the steering device or the steering angle sensor is based on motor rotation of a power steering control motor and a ratio with respect to the rack and pinion gear.

3. The vehicle steering intervention system according to claim 1, wherein the steering angle sensor is configured to sense rotation of a pinion gear secured to a steering shaft of the vehicle to move a rack.

4. The vehicle steering intervention system according to claim 1, the vehicle steering intervention system including a rack force determination device for determining a rack force, wherein the electronic processor is configured to determine the vehicle steering intervention threshold based on the torque sensed by the driver input torque sensor, the steering angle, the vehicle speed, the rack force, and a model of the vehicle.

5. The vehicle steering intervention system according to claim 1, including a vehicle latitude/longitude acceleration sensor for sensing a vehicle acceleration, wherein the electronic processor is configured to determine the vehicle steering intervention threshold based on the torque sensed by the driver input torque sensor, the steering angle, the vehicle speed, and the vehicle acceleration.

6. The vehicle steering intervention system according to claim 1, including a camera based road detection system for determining a friction of a road surface, wherein the electronic processor is configured to determine the vehicle steering intervention threshold based on the torque sensed by the driver input torque sensor, the steering angle, the vehicle speed, and the friction of the road surface.

7. The vehicle steering intervention system according to claim 1, including a communication bus connecting the electronic power steering unit including the electronic processor to the driver input torque sensor, the steering angle sensor, and the vehicle speed determination device.

8. A vehicle steering intervention system for preventing a loss of control condition or a vehicle rollover condition for a vehicle, the vehicle steering intervention system comprising:

a driver input torque sensor for sensing a torque applied by a driver to a steering device;

a steering angle sensor for sensing a steering angle;

a vehicle speed determination device for determining a vehicle speed; and an electronic power steering unit including an electronic processor and a memory, wherein the electronic processor is configured to:

determine a vehicle steering intervention threshold based on the torque sensed by the driver input torque sensor, the steering angle, and the vehicle speed, and execute a prediction model by:

determining a steering angle gradient from the steering angle sensed by the steering angle sensor, determining a torque gradient from the torque sensed by the driver input torque sensor, predicting whether the vehicle steering intervention threshold will be exceeded within a predetermined time based on the steering angle gradient and the torque gradient, and when the vehicle steering intervention threshold is predicted to be exceeded within the predetermined time, reducing a power steering assist and/or providing a counter steer force to the steering device to avoid the loss of control condition or the vehicle rollover condition.

9. A method for providing steering intervention for a vehicle, the method comprising:

sensing a torque applied by a driver to a steering device with a driver input torque sensor;

sensing a steering angle;

determining a vehicle speed;

determining a vehicle steering intervention threshold with an electronic power steering unit based on the torque sensed by the driver input torque sensor, the steering angle, and the vehicle speed;

determining a steering angle gradient;

determining a torque gradient of the torque sensed by the driver input torque sensor;

predicting, with a prediction model stored in the electronic power steering unit, whether the vehicle steering intervention threshold will be exceeded within a predetermined time based on the torque gradient and the steering angle grandient; and when the vehicle steering intervention threshold is predicted to be exceeded within the predetermined time, the electronic power steering unit is configured to reduce a power steering assist and/or provide a counter steer force to the steering device to avoid a loss of control condition or a vehicle rollover condition.

10. The method according to claim 9, wherein the steering angle is sensed by a steering angle sensor disposed on a steering column of the steering device.

11. The method according to claim 9, wherein the steering angle is sensed by a steering angle sensor configured to sense rotation of a pinion gear secured to a steering shaft to move a rack.

12. The method according to claim 9, the method including sensing a rack force with a rack force determination device, and wherein the determining of the vehicle steering intervention threshold is based on the torque sensed by the driver input torque sensor, the steering angle, the vehicle speed, the rack force, and a model of the vehicle.

13. The method according to claim 9, the method including sensing a vehicle acceleration with a vehicle latitude/longitude acceleration sensor, and wherein the determining of the vehicle steering intervention threshold is based on the torque sensed by the driver input torque sensor, the steering angle, the vehicle speed, and the vehicle acceleration.

14. The method according to claim 9, the method including determining a friction of a road surface with a camera based road detection system, and wherein the determining of the vehicle steering intervention threshold is based on the torque, the steering angle, the vehicle speed, and the friction of the road surface.

15. The method according to claim 9, the method including a communication bus connecting the electronic power steering unit including an electronic processor and a memory to the driver input torque sensor, to a steering angle sensor, and to a vehicle speed determination device.

16. The method according to claim 15, the method including a driver assistance system domain controller connected to the communication bus.

17. The method according to claim 9, the method including:

determining a rack force with a rack force determination device, sensing vehicle acceleration with a vehicle latitude/longitude acceleration sensor, and sensing friction of a road surface with a camera based road detection system for determining the friction of the road surface, wherein the determining of the vehicle steering intervention threshold is based on the torque sensed by the driver input torque sensor, the steering angle, the vehicle speed, the rack force, the vehicle acceleration, and the friction of the road surface.

* * * * *